(12) United States Patent
Heijnen et al.

(10) Patent No.: US 6,183,642 B1
(45) Date of Patent: *Feb. 6, 2001

(54) BIOLOGICAL TREATMENT OF WASTEWATER

(75) Inventors: Joseph Johannes Heijnen, Rijen; Marinus Cornelius Maria van Loosdrecht, De Lier, both of (NL)

(73) Assignee: Grontmij Advies & Techniek B.V., De Bilt (NL)

( * ) Notice: Under 35 U.S.C. 154(b), the term of this patent shall be extended for 0 days.

This patent is subject to a terminal disclaimer.

(21) Appl. No.: 09/237,603

(22) Filed: Jan. 25, 1999

Related U.S. Application Data

(63) Continuation-in-part of application No. 08/915,870, filed on Aug. 21, 1997, now Pat. No. 5,863,435.

(51) Int. Cl.⁷ .................................................. C02F 3/30
(52) U.S. Cl. ...................... 210/605; 210/610; 210/614; 210/630; 210/903
(58) Field of Search .................... 210/605, 610, 210/614, 620, 630, 631, 903

(56) References Cited

U.S. PATENT DOCUMENTS

| | | | | |
|---|---|---|---|---|
| 3,701,727 | * | 10/1972 | Kormanik | 210/630 |
| 4,655,925 | * | 4/1987 | Tabata et al. | 210/605 |
| 4,793,929 | * | 12/1988 | Kickuth et al. | 210/605 |
| 5,076,928 | * | 12/1991 | Ballnus | 210/614 |
| 5,266,200 | * | 11/1993 | Reid | 210/614 |
| 5,624,565 | * | 4/1997 | Lefevre et al. | 210/614 |
| 5,626,754 | * | 5/1997 | Ballnus | 210/605 |
| 5,861,095 | * | 1/1999 | Vogel et al. | 210/605 |

FOREIGN PATENT DOCUMENTS 292438   3/1990   (DE).

OTHER PUBLICATIONS

Swiss Federal Institute for Environmental Science and Technology (EAWAG), "Nitrogen Removal from Digester Supernatant –Comparison of Chemical and Biological Methods", H. Siegrist, pp. 321–328.

Stowa Report 95–08.

Delft Integraal, "Single–Reactor Nitrogen Removal Process: Simple & Effective", part 12, No. 1, 1995, Tu Delft–NL, pp. 3–7.

* cited by examiner

Primary Examiner—Christopher Upton
(74) Attorney, Agent, or Firm—Jones, Day, Reavis & Pogue

(57) ABSTRACT

A method is described for the biological treatment of ammonium-rich wastewater in at least one reactor which has a temperature of at least 25° C., which involves the wastewater being passed through the said reactor(s) with a population, obtained by natural selection in the absence of sludge retention, in the suspended state of nitrifying and denitrifying bacteria to form, in a first stage with the infeed of oxygen, a nitrite-rich wastewater and by the nitrite-rich wastewater thus obtained being subjected, in a second stage without the infeed of oxygen, to denitrification in the presence of an electon donor of inorganic or organic nature, in such a way that the contact time between the ammonium-rich wastewater and the nitrifying bacteria is at most about two days, and the pH of the medium is controlled between 6.0 and 8.5 and the excess, formed by growth, of nitrifying and denitrifying bacteria and the effluent formed by the denitrification are extracted. In addition the growth rate of the nitrifying and denitrifying bacteria is expediently controlled by means of the retention time, in the reactor, of the wastewater to be treated which is fed in.

12 Claims, 1 Drawing Sheet

BIOLOGICAL TREATMENT OF WASTEWATER

This application is a continuation in part application of application Ser. No. 08/915,870, filed Aug. 21, 1997, now U.S. Pat. No. 5,863,435

FIELD OF THE INVENTION

The invention relates to a method for the biological treatment of ammonium-rich wastewater in at least one reactor which has a temperature of at least 25° C., by the wastewater being passed through the said reactor(s) with a population, obtained by natural selection in the absence of sludge retention, in the suspended state of nitrifying and denitrifying bacteria to form, in a first stage with the infeed of oxygen, a nitrite-rich wastewater and by the nitrite-rich wastewater thus obtained being subjected, in a second stage without the infeed of oxygen, to denitrification in the presence of an electron donor, in such a way that the retention time of the ammonium-rich wastewater is at most about three days, and the pH of the medium is controlled between 6.0 and 8.5 and the excess, formed by growth, of nitrifying and denitrifying bacteria and the effluent formed by the denitrification are extracted.

DESCRIPTION OF RELATED ART

Such a method is known from a publication in Delft Outlook, 95.2, pp. 14–17. However, the research reported in this publication was carried out on a laboratory scale.

As a result of discharge standards having become more stringent, in particular for nitrogen, there is a need for efficient, cost-effective purification systems for the treatment of wastewater. Examples of these concentrated industrial wastewater streams are, wastewater streams like those released with off-gas treatment etc. Another example of the concentrated nitrogen-rich wastewater stream is the so-called rejection water. This rejection water stream is formed after dewatering of fully digested sewage sludge and has not only a high ammonium concentration (about 1000 mg of $NH^4$—N per liter) but also a high temperature (usually about 30° C.). The ammonium in the rejection water may account for as much as 15% of the total nitrogen loading of a wastewater treatment installation, while the volume flow of the rejection water is only less than 1% of the wastewater volume flow to be processed. This rejection water therefore makes a considerable contribution to the nitrogen loading of the treatment installation.

The biological treatment of such wastewater streams normally makes use of treatment processes in which the high sludge concentrations required are obtained by employing a form of sludge retention such as settling, membrane filtration, attachment to filter media, etc. In that context it is worth drawing attention to the STOWA report 95-08, which relates to the treatment of nitrogen-rich return streams in sewage plants, and to the Proc. 18th IAWQ Biennial, Water Quality International '96, Jun. 23–28 1996, Singapore, pp. 321–328.

An, as it happens, frequently used treatment process is known as the activated-sludge system. Such a system is characterized on the one hand by employing sludge retention by sludge settling and, on the other hand, by the bacteria mainly being present in so-called activated-sludge flocculae. Such flocculae usually have a size of 0.1–2 mm.

SUMMARY OF THE INVENTION

It should be noted that the present process of biological nitrogen removal preferably proceeds in two successive stages, an aerobic and an anoxic stage. Both stages can, in the present invention, take place in one reactor, separated in time, or in separate reactors which may or may not involve a return stream to the first stage. In the first stage the nitrogen present as ammonium is largely converted into nitrite, with the aid of oxygen and nitrifying bacteria. The second stage comprises the conversion of nitrite into molecular nitrogen, said conversion being anoxic and taking place with the aid of denitrifying bacteria.

We have now found, surprisingly, that the method as set forth in the preamble can be carried out on an industrial scale, with an ammonium removal efficiency of more than 90% being achieved, by using electron donors of inorganic nature. Preferably said electron donor of inorganic nature is selected from the group consisting of hydrogen gas, sulfide, sulfite and iron (III) ions, while said electron donor of organic nature is selected from the group consisting of glucose and organic acids, aldehydes and alcohols, having 1–18 carbon atoms.

More in particular we have found that the electron donor demand during the treatment can be controlled as a function of the amount of heat produced in the reactor. These parameters proved to be directly proportional to one another.

It should be noted that during the nitrification two moles of protons are produced per oxidized mole of ammonium. The pH drops as a result. The pH is usually controlled by feeding alkali and/or acid into the reactor. Denitrification furthermore takes place under anoxic conditions, nitrite being used as an electron acceptor. For denitrification to be possible, the presence of not only an electron acceptor, but also of an electron donor is required. Preferably, glucose or hydrogen gas are added in the present process as an electron donor.

In addition, the following may be noted with respect to the present process. For the purpose of nitrogen removal, the ammonium present in the wastewater is not nitrified to nitrate but only to nitrite. Indeed, the term of nitritifying bacteria is sometimes used, to indicate more clearly that what takes place predominantly is the formation of nitrite. The denitrifying bacteria which are capable of anoxic conversion of both the nitrate and the nitrite into molecular nitrogen, consume a electron donor as explained above. The conversion of nitrite into molecular nitrogen requires on its own, however, about 40% less electron donor than the conversion of nitrate into nitrogen. Moreover, the oxidation of nitrite to nitrate costs oxygen. Indeed, direct conversion of nitrite into nitrogen provides another (approximately) 25% savings on the oxygen account. The conversion via nitrite instead of nitrate is therefore very advantageous in economic terms.

If, under certain circumstances, the conversion via nitrate is more attractive, however, than the conversion via nitrite, this can obviously be achieved by extending the retention time, of the wastewater to be treated, in the present process.

In an expedient variation of the present process in addition the growth rate of the nitrifying and denitrifying bacteria is controlled by means of the retention time, in the reactor, of the wastewater to be treated which is fed in. This retention time is an important parameter, since the stability of the nitrifying process may be put at risk as a result of the maximum growth rate of the biomass decreasing as the temperature decreases. This therefore requires a higher temperature than with known, more conventional processes. In practical trials the influent of the reactor was found to have a temperature of 30° C. The biological conversion such as the nitrification will cause the temperature to rise by about 15° C. per gram of nitrogen per liter removed. Increasing the process control temperature beyond 40° C., however, is not advantageous to the stability of the present process. By controlling the amount to be fed in of wastewater to be treated it is therefore possible to control the growth rate of the biomass; the temperature in the system and consequently the heat production therein then reflects the conversion in the system.

It was found that a retention time of the amount of wastewater to be fed in of 0.5–2.5 days, preferably of 1.3–2.0 days, affords optimum results, i.e. an overall removal efficiency of more than 90%.

Expediently, the retention time in the aerobic phase is from 0.5 to 2 days and in the anoxic phase from 0.4 to 1 day. Monitoring of the pH is obviously possible by the pH of the medium being measured directly. Protons (or acid ions) are produced during the nitrification process, as a result of which the pH of the medium drops in accordance with the equation $$NH_4^+ + 1.5O_2 \rightarrow NO_2^- + H_2O + 2H^+$$

The nitrification rate is therefore pH-dependent, so that conversely the pH can be regarded as a relevant process parameter. It was found, incidentally, that during the nitrification buffering may take place by bicarbonate ($HCO_3^-$) which is present in the rejection water fed into the reactor or is added, in accordance with the equation $$HCO_3^- + H^+ \rightarrow H_2O + CO_2$$

For an optimum effect it is important, in this context, that the carbon dioxide is transported (stripped) from the liquid phase to the gas phase. With respect to dimensioning the reactor to be used in the method according to the invention it was indeed found, in this context, that in the case of a ratio of volume to bottom area of the reactor in the range of 2–10 very beneficial results are achieved in terms of the nitrification-denitrification process according to the invention.

The characteristic feature of the invention is that the process takes place without sludge retention being employed, i.e. the sludge retention time is equal to the liquid retention time. To achieve this, both the mixing and the discharge of the treated water need to be effective. Good mixing can be obtained by employing, for example, aeration in the aerobic phase, and in the anoxic phase, for example, by employing mechanical agitators, liquid injection, introduction of low-oxygen or oxygen-free gases etc. As a result of these measures a very active bacterial population is obtained, which is mainly present in the liquid phase as free cells and/or very small clusters of a limited number of cells, rather than activated-sludge flocculae.

It should further be noted that the denitrification in the reactor is carried out under essentially oxygen-free conditions. Such conditions can be formed spontaneously as a result of denitrifying bacteria consuming the oxygen present, the environment consequently automatically becoming anoxic. Expediently, and to accelerate the process if required, the denitrification is carried out, however, with recycling of the nitrogen already formed previously by denitrification. An additional advantage of this is that the nitrogen stream through the reactor at the same time strips the carbon dioxide from the reactor.

As indicated above, the excess, formed by growth, of nitrifying and denitrifying bacteria is extracted. In practice this involves these bacteria being entrained by the effluent from the reactor and being added to the main stream of the wastewater treatment process, after which the further removal of residual ammonium is carried out.

It should be noted that the effluent from the reactor is preferably withdrawn therefrom at a point below the liquid level prevailing in the reactor, expediently with local intensive mixing. While at the moment this cannot be stated with certainty, this measure may be essential for a process without sludge retention.

According to an attractive variation of the method according to the invention, the nitrite-rich, acidic effluent formed by nitrification is used, at least in part, for the neutralization of ammonia. This ammonia can be present both in the rejection water to be treated and, alternatively, in a process stream of whatever origin. The treatment can be carried out, for example, in a gas scrubbing installation known per se, whereas the effluent obtained after treatment can be recycled, for further treatment, to the nitrification reactor according to the invention.

BRIEF DESCRIPTION OF THE DRAWINGS

The accompanying FIGS. 1 and 2 schematically show the progress of the nitrification/denitrification process according to the invention. More in particular, FIG. 1 provides a sketch of the pH profile in the reactor, the pH being controlled between 8 and 7 with the addition of acid or alkali.

DETAILED DESCRIPTION OF THE INVENTION

It should be noted that if it is undesirable or less desirable for the bacteria present in the effluent to reach the main stream of the wastewater treatment process when the effluent is recycled to said main stream, said effluent, according to a very expedient embodiment of the method according to the invention, is first subjected to a treatment with protozoa. Such a variation is of interest, in particular, if the influent of the reactor is a COD containing wastewater. The term COD refers, as usual, to chemical oxygen demand; the component relevant thereto in solution is primarily formed by carbon bound in organic compounds. This material acts as a nutrient for the bacteria present in the reactor. By subjecting the effluent of the biological treatment to a treatment with protozoa it proved possible to largely remove the bacteria suspended in the effluent and entrained from the reactor.

It should also be noted that the principle, employed in the method according to the invention, of the absence of sludge retention can also expediently be employed in the treatment of COD-containing wastewater. More in particular this then means replacing the present nitrite route by the COD route, in which case an overall removal efficiency of more than 50% was obtained.

The invention is explained in more detail with reference to an exemplary embodiment.

EXAMPLE

In this example a continuous flow reactor without sludge retention was employed. Such a reactor makes it possible for the bacterial population having the lowest maximum growth rate to be flushed from the system selectively.

The reason for this is that a retention time can be used which is lower than the maximum reciprocal growth rate of the one bacterial population (in this case the nitrite oxidizers which oxidize the nitrite present to nitrate), but is higher than the maximum reciprocal growth rate of the other bacterial population (in this case the ammonium oxidizers). Flushing out the nitrite oxidizers therefore leads to a build-up of nitrite in the reactor.

The reactor used had a diameter of about 20 m and a height of 6 m and therefore an effective volume of about 1150 m$^3$.

The influent for the reactor, the so-called rejection water, had a temperature of about 30° C. and an ammonia concentration of about 1000 mg of N/1, while the total amount of rejection water fed in was about 760 m$^3$ per day.

For the purpose of converting ammonia into nitrite, followed by the conversion into nitrogen, the reactor contained about 120 kg of biomass.

Figure 1:
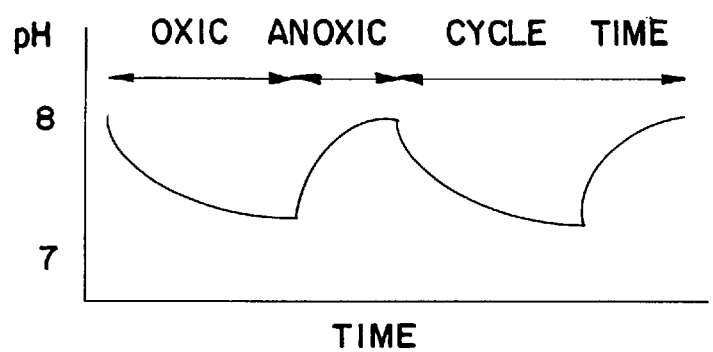
Figure 2:
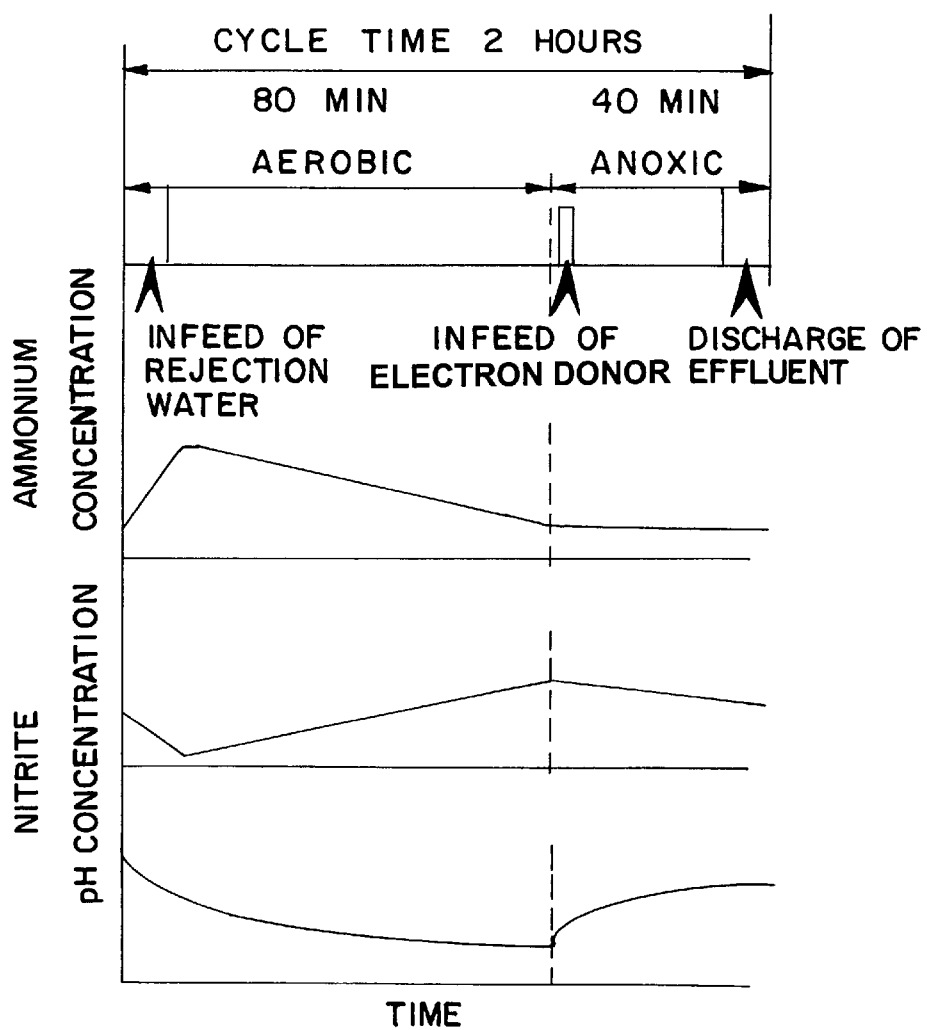
FIG. 2 also represents the change in time, produced by an electron donor such as glucose or hydrogen gas fed in, of the nitrite concentration and ammonium concentration for one cycle.

The treatment of the rejection water took place in the reactor with a cycle configuration as shown in FIG. 2, i.e. a cycle time of about 2 hours consisting of an aeration period of ±80 min, followed by a period involving recycling of the nitrogen gas formed in a first period of about 40 min.

In the steady state of the process the amount of rejection water fed to the reactor was such that the retention time was about 1.5 days; hydrogen gas were added as electron donor (in a similar run, glucose was added with the same good result).

The rejection water thus treated had a nitrogen concentration of as little as about 80 mg of total N-1$^{-1}$, which could be recycled for treatment to the main stream of the treatment installation. The result of the treatment of this rejection water was therefore a purification efficiency of about 90%.

What is claimed is:

1. A method for the biological treatment of ammonium-rich wastewater in at least one reactor which has a temperature of at least 25° C., by the wastewater being passed through the said reactor(s) with a population, obtained by natural selection in the absence of sludge retention, in the suspended state of nitrifying and denitrifying bacteria to form, in a first stage with the infeed of oxygen, a nitrite-rich wastewater and by the nitrite-rich wastewater thus obtained being subjected, in a second stage without the infeed of oxygen, to denitrification in the presence of an electron donor of inorganic or organic nature, in such a way that the contact time between the ammonium-rich wastewater and the nitrifying bacteria is at most about two days, and the pH of the medium is controlled between 6.0 and 8.5 and the excess, formed by growth, of nitrifying and denitrifying bacteria and the effluent formed by the denitrification are extracted, the demand for said electron donor during the treatment being controlled as a function of the amount of heat produced in the reactor.

2. A method according to claim 1, wherein said electron donor of inorganic nature is selected from the group consisting of hydrogen gas, sulfide, sulfite and iron (III) ions, and said electron donor of organic nature is selected from the group consisting of glucose and organic acids, aldehydes and alcohols having 1–18 carbon atoms.

3. A method according to claim 1, wherein in addition the growth rate of the nitrifying and denitrifying bacteria is controlled by means of the retention time, in the reactor, of the wastewater to be treated which is fed in.

4. A method according to claim 3, wherein a retention time of 0.5–2.5 days is used.

5. A method according to claim 3, wherein the retention time of the wastewater to be treated is extended, under nitrifying conditions, to form nitrate.

6. A method according to claim 3, wherein a retention time of 1.3–2.0 days is used.

7. A method according to claim 1, wherein the denitrification in the reactor is carried out under essentially oxygen-free conditions.

8. A method according to claim 1, wherein the denitrification is carried out with recycling of the nitrogen already formed previously by denitrification.

9. A method according to claim 1, wherein the effluent is withdrawn from the reactor at a point below the liquid level prevailing in the reactor.

10. A method according to claim 1, wherein the effluent of the biological treatment is subjected to a treatment with protozoa.

11. A method according to claim 1, wherein the nitrite-rich, acidic effluent formed by nitrification is used, at least in part, for the neutralization of ammonia.

12. A method for the biological treatment of ammonium-rich wastewater in at least one reactor which has a temperature of at least 25° C., by the wastewater being passed through the said reactor(s) with a population of nitrifying and denitrifying bacteria to form, in a first stage with the infeed of oxygen, a nitrite-rich wastewater and by the nitrite-rich wastewater thus obtained being subjected, in a second stage without the infeed of oxygen, and with sludge retention, to denitrification in the presence of an electron donor of inorganic or organic nature, in such a way that the contact time between the ammonium-rich wastewater and the nitrifying bacteria is at most about two days, and the pH of the medium is controlled between 6.0 and 8.5 and the excess, formed by growth, of nitrifying and denitrifying bacteria and the effluent formed by the denitrification are extracted, the demand for said electron donor during the treatment being controlled as a function of the amount of heat produced in the reactor.

* * * * *